United States Patent [19]

Schacht

[11] 4,327,396
[45] Apr. 27, 1982

[54] COMBINATION OF ELECTRICAL METER SOCKET COLUMN AND PANELBOARD FOR CONVERSION TO INDIVIDUAL TENANT METERING

[76] Inventor: Ezra L. Schacht, P.O. Box 8367, Houston, Tex. 77004

[21] Appl. No.: 91,933

[22] Filed: Nov. 7, 1979

Related U.S. Application Data

[63] Continuation-in-part of Ser. No. 923,545, Jul. 11, 1978, abandoned.

[51] Int. Cl.³ .......................... H02B 1/04; H02B 9/00
[52] U.S. Cl. .................................... 361/379; 361/361; 361/363; 361/372
[58] Field of Search ................ 361/331, 332, 356–363, 361/364–375, 346, 353, 355, 379, 381–383

[56] References Cited

U.S. PATENT DOCUMENTS

4,080,644  3/1978  Reed ..................................... 361/358
4,204,245  5/1980  Luke ..................................... 361/358

Primary Examiner—Gerald P. Tolin

[57] ABSTRACT

Conversions to multiple electrical energy metering, in which a group of meters must be installed near an existing panelboard containing circuits for several apartments present problems, especially when the new meter column must be installed on a brick veneer wall in which the existing panel is recessed. Special wire bussing, transition enclosures, connectors and replacement panelboard interiors are combined to make a safe and economical conversion kit for ease of installation by electricians, while minimizing potential maintenance problems for the electrical utility.

5 Claims, 14 Drawing Figures

COMBINATION OF ELECTRICAL METER SOCKET COLUMN AND PANELBOARD FOR CONVERSION TO INDIVIDUAL TENANT METERING

This application is a CIP of Ser. No. 923,545, filed 7/11/78 now abandoned.

BACKGROUND OF THE INVENTION

In apartment complexes and the like, electrical energy can be conserved by converting from existing master-metered systems to individual tenant metering. Specifically, we are concerned with those apartment complexes in the Sun Belt, in which raintight panelboard enclosures, mounted on the exterior walls of the buildings, are equipped with a single main breaker, usually of 200-ampere rating, bussing of the same rating, and enough bus-mounted "stabs" to provide an adequate number of branch-circuit breakers for *two or more* apartments. The individual panelboard may be one of several served by an underground feeder from a pad-mounted transformer located nearby. The primary of such a transformer may in turn be served by an underground 7200-volt feeder, looping from transformer to transformer, but fed at one point from the utility supply, at which point the master meter is usually located.

Present methods of coversion from master-metered installations to individual tenant metering, many examples of which may be seen in the Houston area, generally employ the following method: The existing panelboard-enclosure may be removed from the wall (if surface-mounted), or the brick around it is broken out (if recessed), and the end of the underground feeder conduit is cut off, and terminated in a large raintight junction box, set within two or three feet from the ground; the feeder conductors now terminate in this box; above this box are mounted a bank of meter-sockets, and above the sockets are mounted new individual raintight panelboards, one for each apartment and one for the building service if necessary; raceways are next extended from the old gutted panelboard enclosure to the new individual panelboard enclosures, and the branch circuits are extended and and spliced as necessary; new circuit-breakers are installed, and the old breakers, if of a different manufacturer, are discarded, along with the old interiors and other hardware.

The existing panelboard enclosure, serving two or more apartments, may have been neatly mounted on the wall surface or recessed within the brick veneer in a space of approximately fourteen inches wide by thirty inches high.

The revised installation requires extensive brick removal, shortened service conduits, rerouted service conductors, additional junction boxes or gutters, new individual tenant panelboards, and a plethora of conduits or raceways run from the new panelboards to the old gutted panel, now reduced to a splice box. To compound the problem, there may not be enough space for this massive amount of new equipment, since the existing panel may have been mounted between windows, or at the corner of a building, where a wall space of approximately one foot is all that may be available for the conversion equipment. Frequently, a large plywood panel may be used primarily for mounting the new boxes, and it may be used secondarily to cover the large hole of several square feet due to the removal of the brick. The prior integrity of the brick veneer wall against rain and moisture has now been replaced by a caulked joint at the edge of a plywood panel and the remaining brick surface, hardly an equivalent substitute.

This crude meter conversion system, therefore, is unsightly, takes up a great deal of wall surface, may have to be remotely located from the existing panelboard for lack of room, and is expensive. Yet it represents the state of the art in mid 1978, and many hundreds of meter loops are being converted by such crude methods, using standard stock materials and equipment available to local electrical contractors from their wholesalers.

Furthermore, construction of many apartment complexes was of the most competitive type and brick ties, if provided, are inadequate to hold the higher courses of brick in place after removal of those required for recessing the box.

A novel box, is therefore a part of this invention, combining conventional raintight construction with a brick-sized blister or extension on the back of the box. This permits removal of one brick, or equivalent in one course, and provides access to the side of the recessed panel box; and the supporting brick-shaped extension, if made of suitable gauge of metal in the manner disclosed, is more than equivalent to that of the removed brick.

In another embodiment, a novel elbow-like transition, essentially fabricated of standard electrical conduit, may be bolted or welded to the back of the junction box. Conventional elbows, even of the short-radius or street-ell type are too bulky for use in the cramped space for these metering applications. The novel ship-ventilator-like section of this novel elbow-like fitting facilitates the mechanical redirection of the heavy feeder (now service) conductors into the junction box, a problem of considerable difficulty for the large wire sizes (say 4/0 to 250MCM copper or aluminum) frequently used to feed those panels, yet requires only the removal of one brick or its equivalent.

In another embodiment, a modification of the novel elbow-like fitting is connected directly to the meter column, dispensing with the junction box entirely, and the line and load wires to the individual meter sockets are aligned and brought through an elbow-like fitting and are connected to the heavy feeder (service) conductors *within* the existing panelboard, if recessed; if surface mounted, a simple nipple connection between meter column and panel enclosure is employed.

This is made possible by a novel connector for the heavy feeder conductors to the individual meter line-conductors. This connector takes little more space than the conductor itself, and has an insulating sleeve. With such an improvement, the space required for the connections can be obtained within the existing panels and the problem of rerouting the heavy feeder wires into the junction-box nipples or junction-box extension avoided.

The unique metercolumn, which may be mounted horizontally, has great appeal to utilities.

Utilities, the Houston Lighting and Power Company included are reluctant to stock and install more than one style of meter socket and enclosure, because they must also stock the necessary replacement parts. Thus, for example, the Houston Lighting and Power Company stocks the standard 100-ampere General Electric meter socket, Cat. No. 582X23, or its Westinghouse equivalent, *and the terminal clips and hardware*, but is understandably reluctant to purchase more than one of the Plethora of ganged meter sockets presently manufactured to meet the individual metering requirements for apartment complexes or the like. The novelty of this invention for gangable sockets has been disclosed in patent application Ser. No. 889,109, but this application discloses improved means of connecting line and load leads to the terminals of the General Electric and Westinghouse meter sockets, or their equivalents.

In the interests of compactness, because the column may have to be mounted in a restricted space on a finished exterior wall, it is desired to have the meter-supporting column as small as possible, completely sealed against the entry of rain or moisture, and tamperproof. A tube of regular cross-section, say two by four inches, is well suited for this purpose, and the General Electric circular meter sockets mount well thereon.

To assure sealed construction, and because the cross-section of the column is so small, the preferred embodiment of the invention employs insulated wires for both line and load leads to each meter socket.

A novel part of this combination is the replacement panelboard interior, with the subdivided bussing for individual apartments mounted on one pan, integral alignment devices for mounting within the existing enclosure, and for safety, a dead-front panel dimensionally variable to fit the width of the existing enclosure. Novel panelboard interiors of this design may be made for the panelboard enclosures manufactured by Federal Pacific Electric Company, ITE, General Electric Company, Square D Company and others, by simple variations in bussing insulation and spacing.

Accordingly, it is a primary object of the present invention to provide a further improved apparatus to facilitate the conversion from master-meter to tenant metering as outlined in the foregoing paragraph.

A further object of this invention is to disclose an improved method of making feeder-(now service)-to-meter connections within the cramped space within the existing panelboard, rather than within the junction-box at the base of the meter column, to avoid excessive manipulation of the heavy feeder (now service) conductors and to provide more compact junction boxes, to effectively reduce the overall height of the meter column, because most utilities prefer that meter faces be centered between four and six feet above grade.

Other objects, advantages, and features of the present invention will become readily apparent to those skilled in the art upon consideration of the following detailed description and with reference to the following drawings, wherein like elements have been identified with like numerals, in which:

Figure 1:
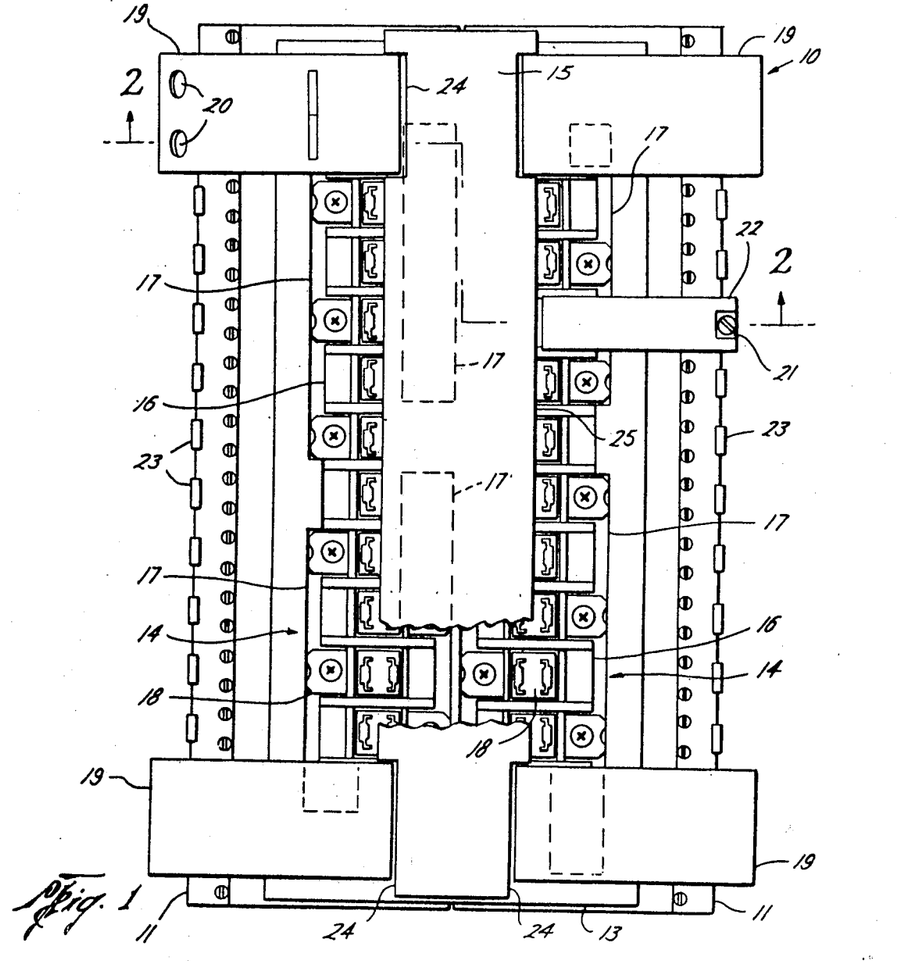
FIGS. 1 and 2 are front and sectional views of a typical multibreaker mounting pan and interior showing bussing and insulative barriers in accordance with the present invention
Figure 2:
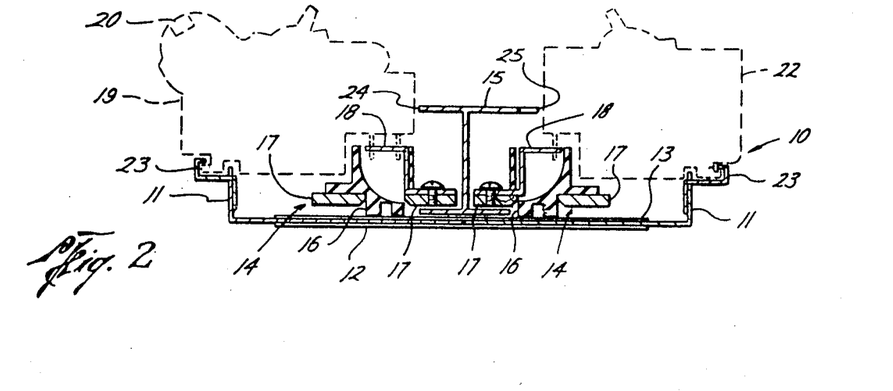

With reference now to FIGS. 1 and 2, there may be seen a typical replacement multi-breaker assembly 10, comprising two mounting pans 11, fastened in rigid alignment in one plane with metal strips 12 or the like; an insulative barrier sheet 13, two connecting-mounting strips 14 for main and branch breakers; and an insulating generally H-shaped member 15. Each mounting strip 14 comprises insulating supports 16, rectangular busses 17, and multi-breaker connector terminal plug-in jumpers 18. Note that bussing 17 is not continuous but is split so that there are four independent sections, for each of the four apartments, each fed through a main breaker 19 through line conductors to terminals 20, from load side of meter loops. Branch circuits, similarly are connected to breakers 22 at terminals 21. "Fingers" or "hooks" 23 hold main and branch-circuit breakers in position in conventional fashion.

In conventional usage, a single connecting-mounting strip 14 equipped with "hooks" on both sides is mounted on the vertical centerline of a pan, and breakers are plugged in from both sides to the terminals 18. This invention splits the conventional single continuous buss into four sections, or even five or six, in virtually the same space, by slightly widening the pan, and utilizing two such busses, parallelly mounted.

Insulating channel 15 isolates the parallelly mounted center busses 17 from each other, should they be connected to opposite polarities, a possibility in typical field installation. Channel or H-section 15 may be notched at point 24 to locate the preferred position for the main breaker 19, likely to be of 100-ampere rating, should this be of larger physical size than the conventional branch-circuit breaker, as is the case with the Federal Pacific Electric Company line. On the other hand, full width of the H-section 15 at 25 protects unused portion of terminal 18 from exposure or contact when not used as is the case with the branch circuit breakers 22, only one of which is shown. For those mounting pans by manufacturers, such as Square-D and ITE, whose 100-ampere breakers are the same dimensions as the smaller branch circuit sizes, of course an even more compact grouping can be achieved with this system, and the one-inch space required because of the trapezoidal shape of the FPE mounting block conserved.

Figure 3:
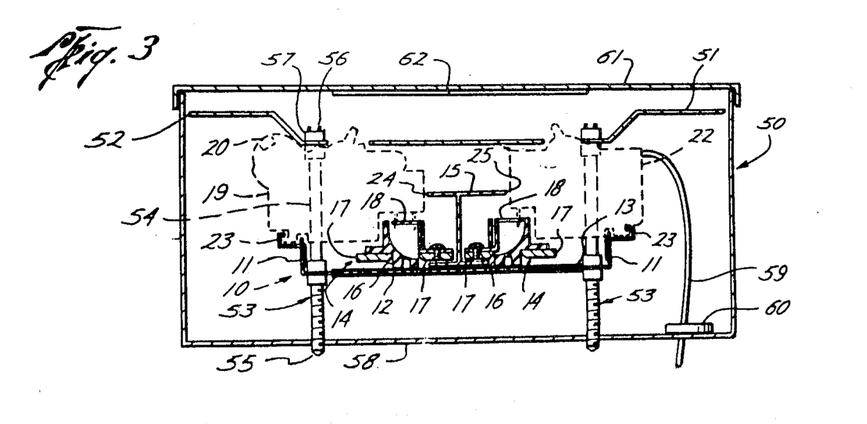
FIGS. 3 and 4 are front and sectional views of the interior of FIGS. 1 and 2, mounted within an enclosure, showing mounting hardware, dead front panel, and barrier isolating service conductors from branch circuit area, as they pass through enclosure to meter column box.
Figure 4:
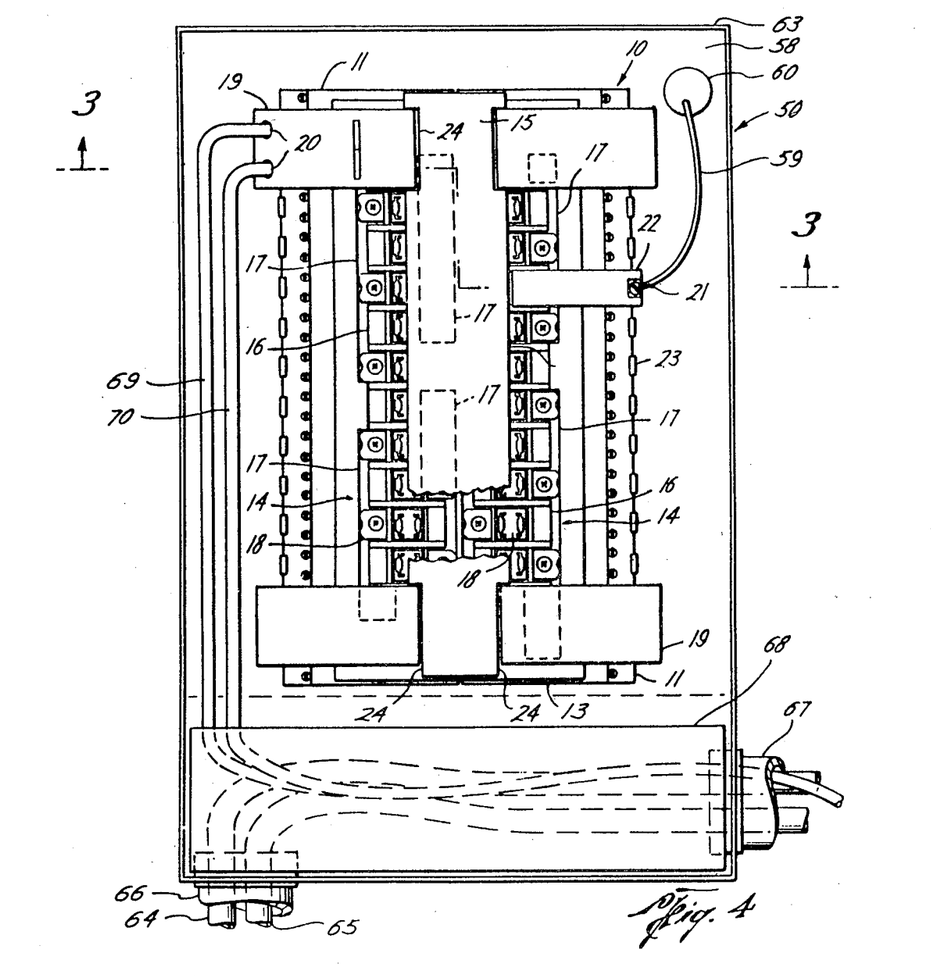

Referring now to FIGS. 3 and 4, the panel interior 10 of FIGS. 1 and 2 is shown mounted within existing enclosure 50. In FIG. 3 only is shown the dead-front panel 51. When normally furnished by the manufacturer for general field installation, deadfront panel 51 will be somewhat wider than the widest raintight panel enclosure 50 likely to be encountered, and will be sheared at a local sheet-metal shop to a width that will provide the clearance required at perimeter gap 52. (Alternately, please refer to FIG. 12). Mounting bolts 53 (only two of four shown only in FIG. 3) serve several functions: lengths 54 serve to hold panel 51 and interior 10 in proper fixed and parallel alignment; points 55 (hardened cones) provide centerpunch marks after assembly 50 and 10 has been aligned in enclosure 50, and ends 56 have been struck sharp blow with a hammer (not shown); tamperproof nuts 57 may be provided to prevent unauthorized access.

In any event, after punch marks have been made in back 58 of box 50, holes may be drilled and tapped for threads 53, left long enough to provide enough space for branch circuit wiring 59 (typical) originating from breaker 22 at terminal 21, and passing, possibly not as directly as shown, out of enclosure through bushing 60, along with other circuits to a specific apartment. Length 53 may be as much as one inch if bushing 60 is close to pan 11, but care must be taken to maintain proper clearance from front cover 61 of enclosure to live parts of interior 10, say one-half inch, or an insulating panel 62 may have to be affixed to interior of cover 61.

It must also be borne in mind that the back of the enclosure 58 may be against the wallboard (sheetrock) of an apartment, so drilled and tapped holes at points 55 have to be made carefully indeed with drill stops and bottoming taps, so that no more than an eighth of an inch penetration, say, into the sheetrock is made, another reason for adjustability in length of bolts 53.

It will be noted that after removal of the old interior from enclosure, the space at the top taken by the old main breaker, say of 200-ampere rating is now available for interior 10, and in FIG. 4, it is so shown, close to the top of box 63. Feeders (now service) conductors 64 and 65 (neutral conductor not included), entering enclosure 50 from transformer through conduit 66, are now bent to pass through enclosure 50 and out through nipple 67 to meter-column junction-box (not shown). Alternately, with other embodiments shown, splices can be made behind utility barrier panel 68, if space permits, to avoid bending and redirecting service conductors 64 and 65 through nipple 67. Load supply conductors 69 and 70 from meter-column return to enclosure 50 through same nipple 67 and terminate at line screws 20 of main breaker (for a single apartment) 19. Barrier 68 is shown as a separate partition from dead front 51, in this embodiment, and may be separately sealed by the utility to prevent tampering with service conductors 64 and 65.

Figure 5:
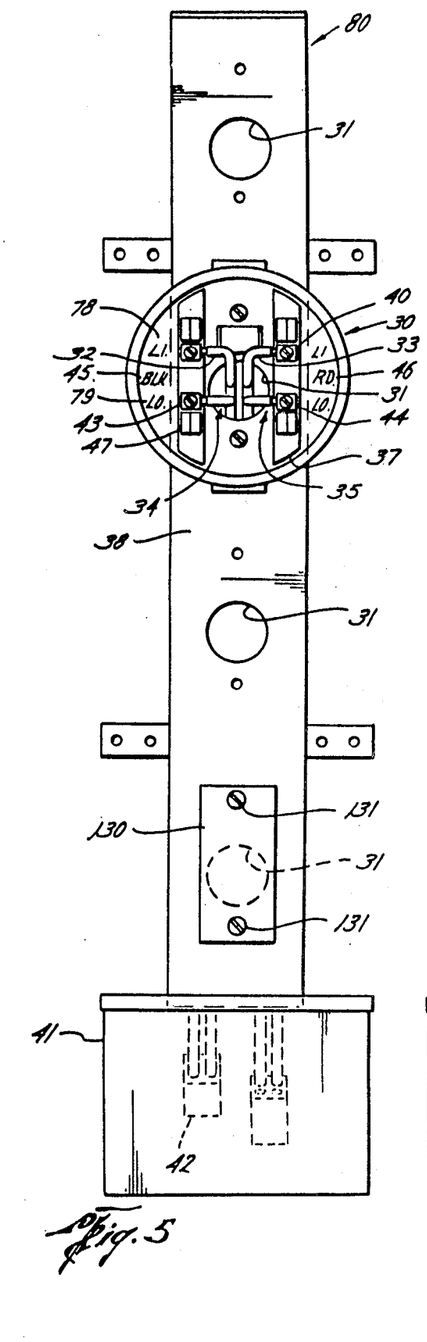
FIGS. 5 and 6 are front and sectional views of the meter column and meter sockets, junction box and insulated wire bussing for line and load conductors.
Figure 6:
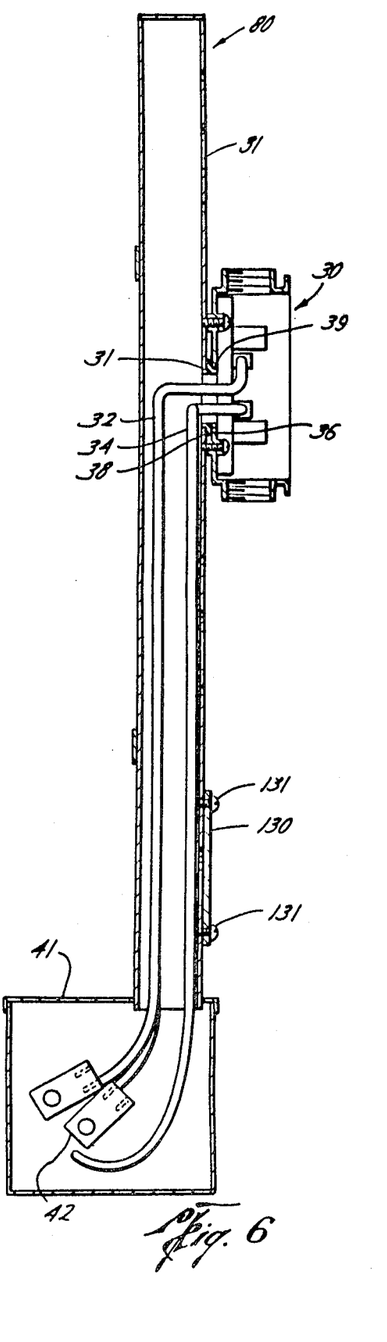

With reference to FIGS. 5 and 6, it will be seen that the meter sockets 30, of which only one of several is shown, have a rear knockout location 31, with a maximum removable hole diameter of 1¾" between insulating supports 37, designed to accept a 1¼ maximum trade-size conduit, in conventional usage. Hole 31 is further reduced in usable diameter by the need for bushing 36, which serves a dual function as raintight seal between face of column area 38 and back of meter socket area 39, as well as protection of insulation of wires 32 through 35 from edges of hole 31 in both column and socket. To utilize this knockout 31 as shown, it is necessary to make some very sharp bends in the line and load leads 32 through 35. Such bends can be made with simple fixturing, without damaging the Nylon jacket of the No. 4 THHN 19-strand Machine Tool Wire Copper conductors, which seem most suitable for this application. An additional benefit is that the insulated #4 THHN conductor has an overall diameter small enough to slip within the meter socket terminal 40, so that bent leads 33 and 35 can be shifted, insulation and all, fully to the right in terminals 40, providing space for the insertion of leads 32 and 34 in their respective terminals. Obviously, some modifications can be made on special order in the General Electric and Westinghouse socket terminals to avoid these installation problems, but it must be borne in mind that the objective is the use of a standard meter-socket with standard replacement parts which can be stocked by the utility, and the discovery that #4 THHN wire may be used in this fashion is useful, both in original installation and in replacement by the utility should new parts be required.* This is also the reason for not bringing the line or load wires through the tapped hubs, so that the entire socket can be easily removed or replaced with a blank plate should it be necessary. Also shown is the junction-box 41, located for recessed mounting within the wall, with terminal lugs 42 for receipt of service conductors 64 and 65.

Spare meter socket positions may be provided by covering a hole 31 with blank plate 130 held in place by screws 131, as shown in FIGS. 5 and 6.

Figures 7, 8:
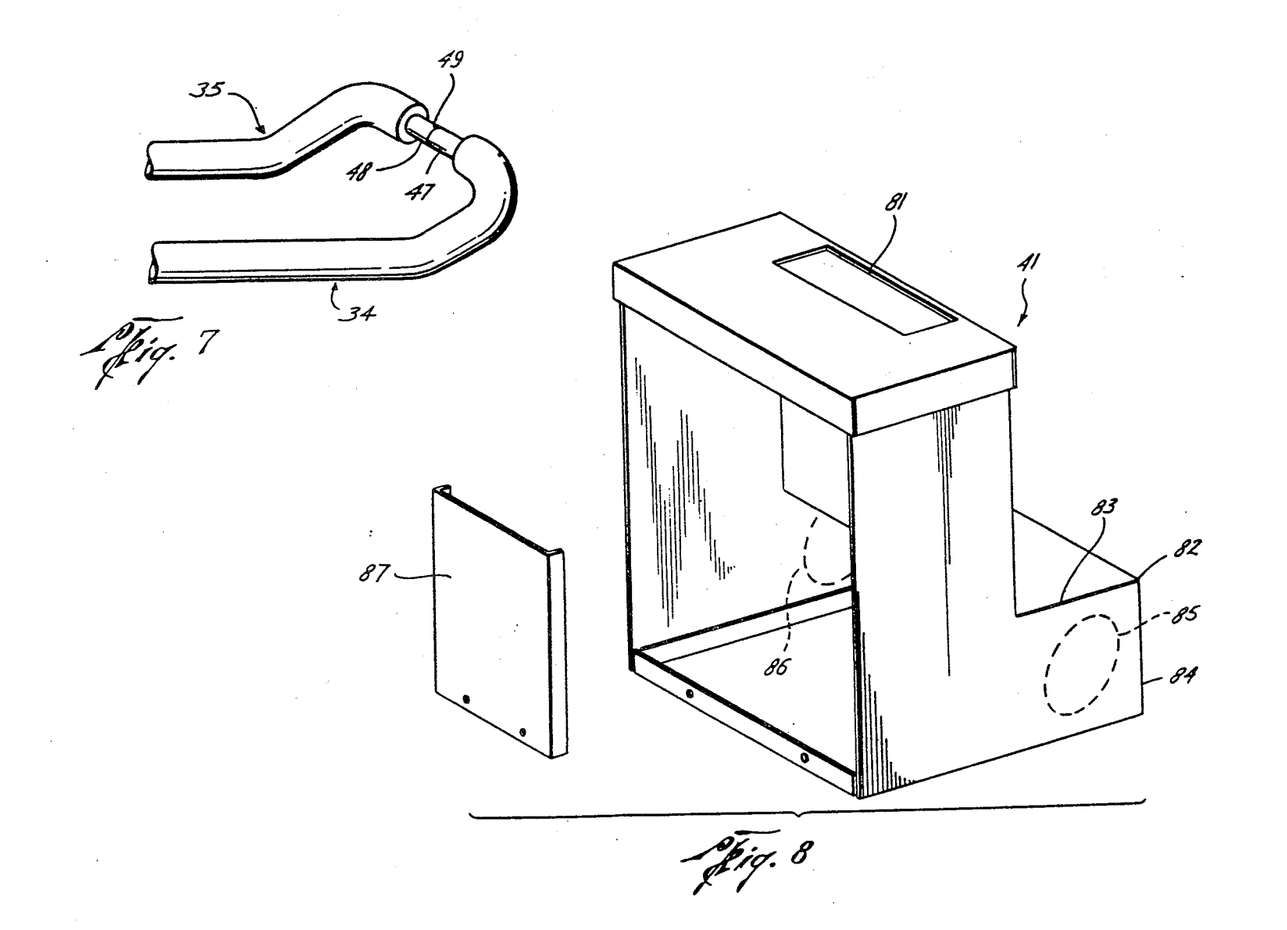
FIG. 7 is a pictorial view of a typical bent-and-formed insulated meter conductor before being cut into two line or load leads.
FIG. 8 is a pictorial view of a typical raintight junction box with the extension required to replace the removed brick.

FIG. 7 shows the bent #4 THHN insulated copper wire bussing made from a single conductor twice as long as required. No readily available tooling or forming devices can handle this stiff wire in the manner desired, but it is relatively simple to form the wire to the contours shown. Bends are made as shown in meter socket 30 of FIGS. 5 and 6 to obtain leads 34 and 35, say, as shown. Center section is then stripped to total length of 47 and 48, as required for good gripping in lugs 43 and 44. As a last step, copper may be sheared on line 49, thus assuring a clean cylindrical conductor end to easily enter lugs 43 and 44, as examples. As noted, outer insulation of conductors 34 and 35 easily enters barrel of terminals 43 and 44, for ease of assembly of these stiff conductors within the confines of the socket interior, and replacement of lugs 43 and meter prong clips 47, or socket 30 itself, if required, can be accomplished without difficulty.

Naturally, it will be necessary to reverse the BLACK 45 and RED 46 markings on every other meter column assembly to utilize all of the pairs of bent bussing 34 and 35, because both are of the same color. BLACK and RED are used in this invention to designate lines or phases A and B, that is, the hot wires of a conventional three-wire 120/240 volt a.c. supply. Although it is conventional for some utilities, such as the Houston Lighting and Power Company, to use black for line leads 32 and 33 and red for load leads 34 and 35 in meter socket connections of this type, it is believed that the LINE and LOAD markings 78 and 79 conspicuously stamped or labelled within the meter socket 30 will prevent errors and facilitate balancing of loads and tracing of service and meter-loop conductors.

FIG. 8 shows a modified junction box 41, for use with recessed existing panels. Meter column 80 (FIGS. 5 and 6) is connected to box 41 in general area 81, and entire back of box 41 need not be recessed in wall, because extension 82 is of a depth 83 and height 84 to generally replace a single removed brick, or its equivalent in masonry, etc. If the brick removed is adjacent to the existing recessed panel enclosure, a knockout may be made in the area 85, and a short or close nipple may be used to connect the box 41 to the existing recessed enclosure. Either side of box 41 may be perforated for the nipple, as at 86, for example, if job site conditions require the box 41 to be to the right of the panel. If structural conditions are such that the masonry above the removed brick requires support, the box 41 may be made of heavier guage sheet metal. In any event, masonry removal and repair is reduced with this installation. Cover 87 (shown reduced in size) is of conventional raintight design.

Figures 9, 11:
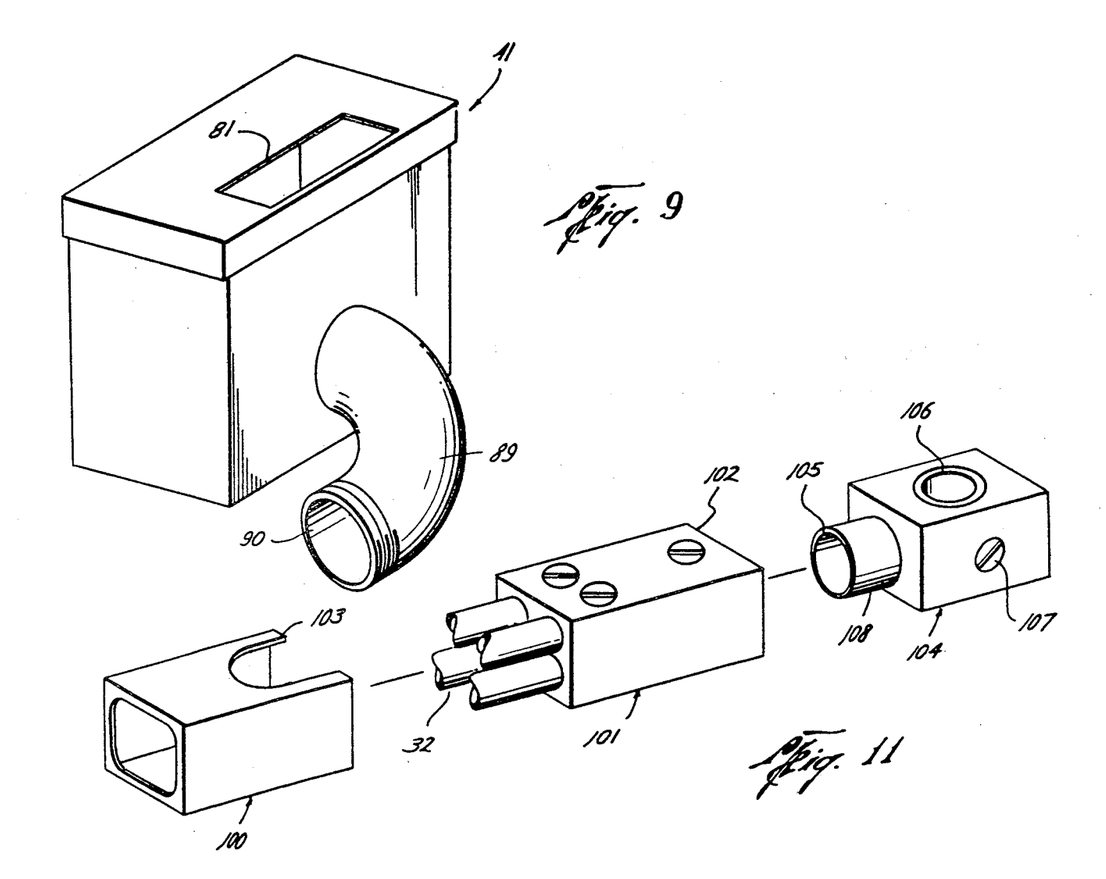
FIG. 9 is a pictorial view of the special transition elbow which is an alternate embodiment to the Extension of FIG. 8.
FIG. 11 is a pictorial view of a novel dual-purpose electrical-conductor connector, for use in limited space within the service compartment area of the existing panel.

FIG. 9 illustrates a rear view of another embodiment of the junction box 41 for recessed panelboard enclosure applications. Meter column 80 is connected at location 81, but instead of the rectangular blister of FIG. 8, a hole, generally elliptical has been cut into the back of the box 41, and a ship-ventilator-like elbow 89 welded or otherwise fastened thereto. End 90 of elbow 89 may be threaded or otherwise fastened to the recessed panel enclosure, and the displacement to the rear may be varied by modifying the shape of the elbow 89, for the type of masonry veneer and recessed depth of enclosure to which it is to be connected. The odd novel shape of the elbow 89 assists substantially in directing and forming the rerouted service conductors 64 and 65 through the panelboard enclosure 50 and into the junction box 41, a difficult task in the limited space with the large conductors encountered.

Figure 10:
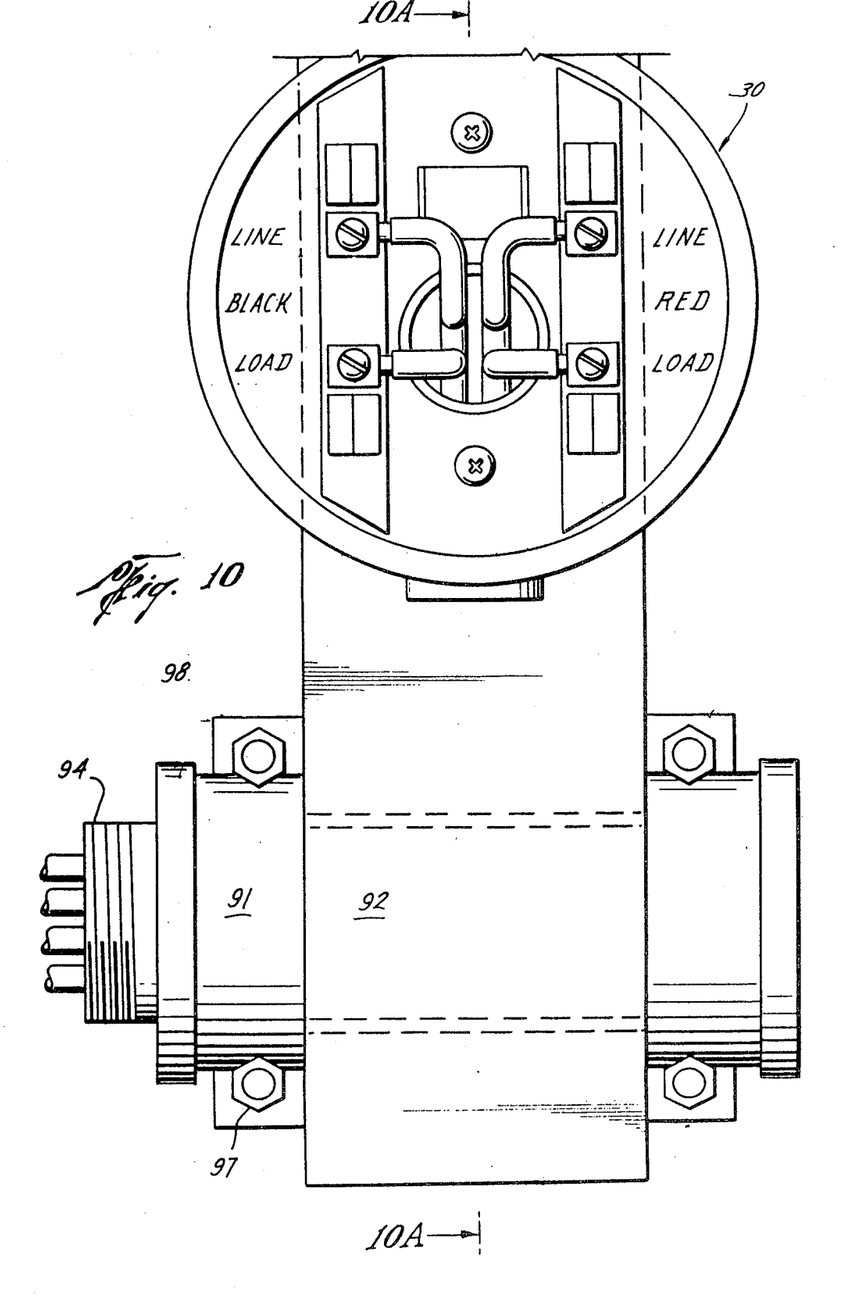
FIG. 10 is a front view of a special transition fitting connected directly to the meter column and the conductor arrangement designed to take up minimum space within the panelboard enclosure.
Figures 10, 10A:
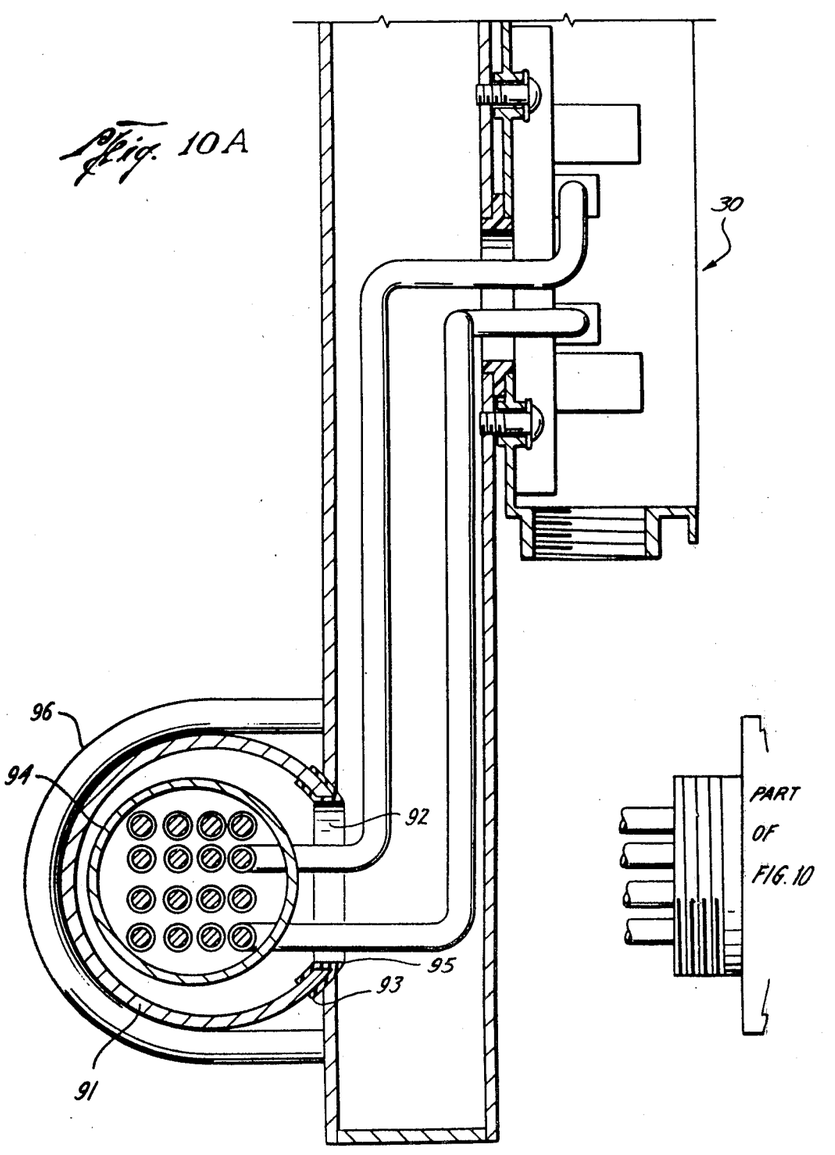
FIG. 10A is a side sectional view of the fitting of FIG. 10.

FIGS. 10 and 10A show an extremely compact embodiment of the present invention. The embodiment shown, for recessed panel application, although surface units may be treated similarly, connects the meter column 80 directly to a pipe-like fitting 91, by aligning a rectangular hole 92 in the fitting 91, with a mating hole 93 in the meter column 80. By techniques already discussed, the line and load leads from the meter sockets 30 may be additionally bent where they issue from column 80 through opening 93, with angles and offsets to be generally aligned with threaded fitting 94, positioned to enter the side wall of the recessed enclosure 50 in conventional fashion. Fitting 91 may then be slipped over the grouped conductors 34, 35, etc., rectangularly-punched-end first, a simple operation because of the short length of fitting 91. A gasket 95 may be employed to seal the joint, and both parts are locked together by two U-bolts 96, tamperproof nuts 97, through welded brackets 99 to sides of column 80. Note that nipple 94 is eccentrically adjustable on cap-like fitting 98, threadedly engaged with fitting 91.

With this invention, it is possible to rotate cap 98, more easily positioning nipple 94 for preferred entry point into recessed enclosure 50. Either end of 91 may be employed for connection to the panel, the other end being capped or plugged. Note that diameter of fitting 91 is substantially the height of a standard brick course, so the previous embodiments shown to limit removal of brick to one course apply to this also, with the further refinement that the height of the junction box, say about twelve inches, is eliminated, reducing the overall height of the meter column 80 and making a neater installation, with greater likelihood that all meter sockets will be within preferred height above grade.

The extension shown, is not limited to a cylindrical profile, but may similar in design to the extension enclosure shown in FIGS. 8 and 9, U.S. Patent Application Ser. No. 889,019, as filed.

Various other embodiments of this adapter will be obvious to those skilled in the art, and it is intended that such embodiments, employing insulated and formed conductors be considered part of this invention.

In FIG. 11 is shown a novel electrical connector, so compact in design that it may be used for connections within the cramped space in the existing panelboard enclosure 50.

As previously noted, rerouting the service conductors into the adjacent meter column junction box can sometimes to difficult, although it does reduce to a minimum the space required within the panelboard enclosure for meter loop splicing. This novel connector, however, takes up virtually no more space than the conductors themselves, and permits the entry of all sixteen meter loop wires 34, 35, etc., into the panelboard enclosure. Of these sixteen wires, eight are connected to the service wires, four to each line lug 101; in this case black line lead 32 from Meter Socket No. 2 is shown connected, as are similar leads from the three other meter sockets. Insulating cover 100 is first slipped over the meter leads 32, etc., and the four leads are connected to the block 101, by set screws, or similar method. Conductor (service) 64 may not be connected by insertion into axial hole in end 102 of connector 101. It is now only necessary to slip insulating cover 100 over connector 101, and fix it in place with a wrap or two of electrical tape, in particular covering slot 103.

On the other hand, should it prove simpler to make an angular connection to conductor 64, say because of proximity of the wall of enclosure 50, additional connector 104 may be slipped over stripped end of conductor 64 by means of hole 106, locked in place by set screw 107. Boss 198, substantially the diameter of the conductor 64, may now be coupled to connector 101, and locked in place. Insulator cover 100 may again be slipped over connection block 101 and piggy-back connector 104, with slot 103 enclosing conductor 64. Again some slight amount of taping may be required, or similar insulating method.

The crosssection of connectors 101 and 104 may be substantially cylindrical, in which case additional rotational movement of part 104 may assist in aligning conductor 64 for various complicated mating angles in this restricted area of enclosure 50.

Figure 12:
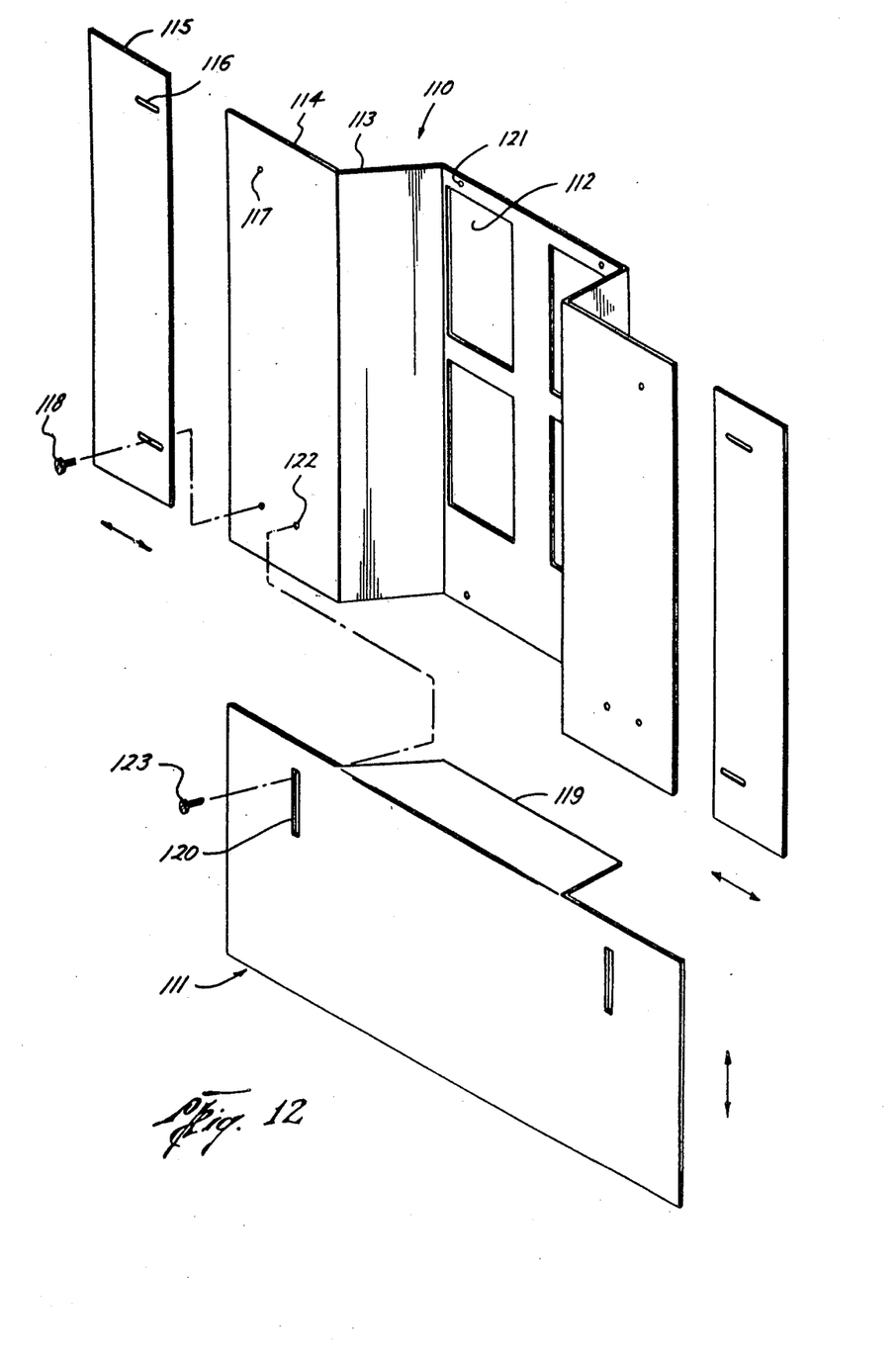
FIG. 12 is a pictorial view of an adjustable dead-front panel and utility compartment barrier.

In FIG. 12 is shown a universal dead front panel and utility compartment barrier, with modifications required for use with a specific manufacturer's interior, in this case Federal Pacific Electric Company. The width of panel 110 is slightly narrower than any enclosure likely to be encountered, say twelve inches, a probable minimum for U/L requirements. The extension plates 115, for wider panel enclosures, may be adjustably engaged with panel 110, through slots 116, tapped holes 117, and screws 118, and be made tamperproof if desired. Angular portion 113 is required because clearance for FPE 100-ampere breakers is greater than for branch breakers up to 70-ampere rating. With interiors of manufacturers whose 100-ampere breakers are the same size as smaller ratings, i.e., General Electric, ITE, such offsets are not needed. Perforations 112 for the probable number of breakers are stamped through the panel, preferably with spaces between individual tenant circuits. Additional holes 121 are provided to mount the panel 110 to the interior 10, as shown in FIGS. 3 and 4.

Panel 111 is designed to blank off the space where the service conductors 64 and 65 are spliced to the meter conductors, or merely pass through on their way to the junction box 41. Inasmuch as the lengths of existing panelboard enclosures may vary from, say, twenty-four to thirty inches, some adjustments in length of panel 111 may be required and slots 120, tapped holes 122 and screws 123 may be used to fix this barrier in position. Angular extension 119 is intended to close the gap created by the unusual FPE front panel design, and provide as much space as possible in the utility compartment. It is not necessary with the breakers of other manufacturers as noted above. This scheme will provide greater versatilitity than the method of shearing oversize deadfront panels to proper enclosure size, but will not give the custom appearance of the sheared plate.

Figure 13:
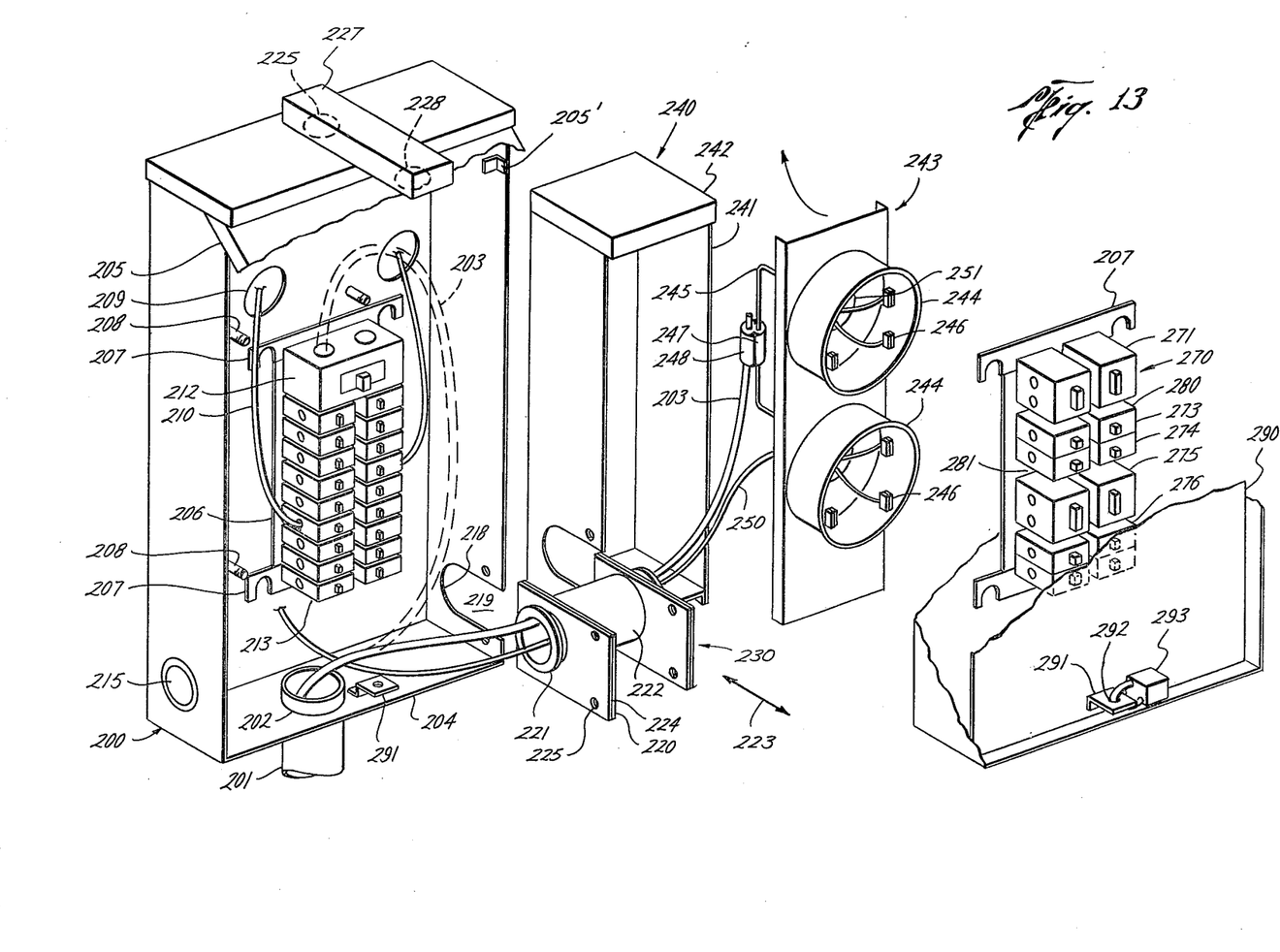
FIG. 13 is a pictorial view of a complete apparatus for meter conversion, in combination with elements which contribute to better heat dissipation in the panelboard enclosure.

With reference now to FIG. 13, there may be seen a complete apparatus for meter conversion, in combination with improved means for removal of the heat developed within the breakers and busing, means to eliminate the need for additional extensions to the heavy service conductors, and a simpler meter-supporting enclosure, both from manufacturing and assembly points of view.

Shown is existing installed panelboard enclosure 200, in this case surface mounted, although recessed enclosures may be converted in similar fashion using means shown in FIG. 8. The existing feeder conduit 201, containing a plurality of hot feeder conductors 203 (only one is shown for clarity) is conventionally connected to enclosure bottom 204 at aperture (usually a knockout) 202. A portion of the raintight cover 205 (partially open) is shown, but the existing dead-front panel, normally supported between clips 205 and vertical bracket on the bottom 204, are not shown, having been removed to provide access to existing interior 206, which has been mounted on studs 208. The existing main breaker 212, if provided, and all of the branch circuit breakers 213, as well as the undivided bus (not shown) feeding all of the tenant breakers 213, are insulatively mounted upon a mounting pan; the parts collectively called an interior 206.

To use the conversion apparatus, which comprises a replacement interior 270, meter-supporting enclosure 240, new dead front panel 290, and various means for coupling the enclosures, making the electrical connections, and dissipating the heat, the following procedure may be followed; After deenergizing the panelboard, conductors 203 are disconnected from the line lugs of the main breaker 212. All hot tenant branch-circuit conductors, of which conductor 210 is typical, are verified, marked, and if desired, disconnected from their respective branch-circuit breakers. Conductors 210 enter the installed enclosure 200 through bushed openings 209. The installed interior 206 may now be removed from its mounting studs 208. It is difficult to deflect a heavy insulated copper or aluminum conductor 203, of say 4/0 or 250 MCM size and force it through a knockout aperture such as 215, conventionally of two-inch trade-size, and located low in the side of the enclosure 200, in order to protect the raintight integrity of the enclosure, and if it is done with the necessary force, and the conductor bent to so small a radius, the insulation of the conductor 203 may be damaged.

A preferred aperture is a tomb-stone shaped slot 219, formed partially with knockout 218 in the enclosure wall. If desired a similar slot may be made in meter-supporting enclosure 240, both axially aligned, and a coupling device comprising a plate 220, or pair of plates, a bushing 221 at each end, a nipple or coupling 222, may be slipped as an assembly over deflected conductors 203, an operation more easily performed if the assembly 230 is moved in the direction out of the paper as shown by arrow 223. The assembly containing the hot feeder conductors 203 may now be pushed in the direction 223 (into the paper), until screw holes 225 are aligned with their mating holes in the enclosures for fastening. Gaskets 224 assure raintightness.

The feeder conductors 203 have now been directed into the meter-supporting enclosure 240. This enclosure is a preferred embodiment for locations where space is limited, since a width of no more than seven or eight inches is required. A sheetmetal channel is capped with a raintight cover 242. The front cover 243 has mounted thereon the requisite number of meter sockets 244, in this case two, in a manner shown in detail in FIGS. 5, 6, 10, and 10A. Insulated jumpers 245, typically of 4THHN conductor, because of the small outer diameter, flexibility, and 100-ampere rating for services to residences, may be connected to the proper line terminals 251 of the meter sockets 244, additionally stripped at approximate midpoint for connection to connector 247, said connector also gripping service feeder conductor 203, with a final layer of shrink tubing or tape for insulation (not shown).

Note that the length of the conductor 203 is adequate to reach directly to the preferred location of the meter taps 245, thus making expensive extensions of heavy conductor 203 unnecessary, and that the conductor was not given any unnecessary pressure or abuse in its relocation. Conductors 250 (only one shown) are the connection means from the load terminals 246 of the meter sockets 244, passing through the coupling means 230 into the installed enclosure 200 to the new main breakers 271 for the individual apartments, all mounted on the replacement interior 270, which in many conversions may be equipped with the same mounting brackets 207 as the installed old interior 206, and may supported by the same studs 208.

However, it should be understood that variations in mounting hardware, brackets and fastening devices, as well as other types of metering enclosures are merely variations on the basic design of the present invention, and use of such alternate devices does not depart from the spirit of this invention.

Special attention should be paid to the design of the replacement interior 270. Note the spaces deliberately left above and below the main apartment breakers 271, as well as spaces adjacent to breakers 275 carrying electric-range or air-conditioning/heating loads. Test performed by the applicant on typical breakers of GE, ITE, and FPE manufacture and rated at 100-amperes developed as much as 9 watts per pole within the breaker housing itself and an additional one watt in the bus-connection resistance, as measured by millivolt drop, using welding transformers to obtain the high currents required. This substantial amount of heat may trip the adjacent branch circuit breakers, if thee is no space between them. This nuisance tripping is especially troublesome with the 15-ampere and 20-ampere breakers, which in themselves can develop 3 to 4 watts within their casings. To avoid nuisance tripping, spaces 280 and 281 are incorporated in this novel interior design.

This is an especially important problem in the Sun Belt states particularly with outdoor raintight panelboards, subject to heat from the sun as well as the heat within the breakers, which can cumulatively approach 200 watts from resistance alone. Further, applicant has found that opening the top of the enclosure, say at aperture 225, may drop the temperature at the busing as much as 5 to 7 degrees Centigrade. This is significant heat dissipation device, especially when one considers that the air drawn up through the panel board enclosure 200 enters from the inside air conditioned spaces within the building, or from the underground feeder 201. It is of course, necessary to provide a raintight cover, shown generically at 227, sealably mounted to the top of the box 200, with an outlet 228 on the underside to permit adequate air flow. Various fittings, such as LB's, may be modified to perform this venting function, as will be apparent to those skilled in the art.

It is thus the intent of this invention not only to permit energy conservation through individual tenant metering, but to materially improve the performance of the existing equipment so modified.

A new dead-front panel 290 will be required, and is punched for the circuit-breaker operating levers in the novel breaker arrangement. At the top it is conventionally held in place by clips 205, but the screw which normally holds the dead-front panel in place against a metal bracket mounted on the bottom 204, is replaced in this invention by a Z-shaped tab 291, perforated with a hole 292 large enough to accept the shackle of the lock 293. This provides a tamperproof enclosure for the tenant circuits, yet permits access to the breakers for all tenants, vital in an emergency.

Applicant has long wondered why the outer cover of the coventional panelboard enclosure may be locked, thus making it impossible for those who are served through the box to have access to their breakers. Obviously, locking the dead-front panel 290 is a more desirable arrangement.

SUMMARY OF ADVANTAGES AND SCOPE OF THE INVENTION

Thus, it may be seen that in the practice of the present invention certain distinct advantages may be realized. A more compact conversion, more economical of materials and labor, than that shown in U.S. Patent application Ser. No. 889,019, may be more simply installed. Certainly this is significant in our continuing national effort to conserve energy, and the salutatory effect of individual metering on energy conservation cannot be ignored.

The present invention is well adapted to attain substantially all of the objects and advantages hereinabove set forth, together with other advantages which will become apparent from the description of the apparatus. For example, the invention is not limited to metering conversions alone, but the novel compact meter column may have application in new installations, as a material and space-saving apparatus in its own right. The apparatus is also useful where individual tenant metering is desired adjacent to a panelboard containing only the main breakers for each apartment. The absence of the branch-circuit breakers merely simplifies the installation.

Nor has applicant seen so versatile a connector as is disclosed for improved service-meter-loop connections in cramped spaces.

This description, including the alternative embodiments, is intended as illustrative of the concept of the present invention, and it is intended that other embodiments be considered as falling within the spirit and scope of the present invention.

What is claimed is:

1. An improved apparatus converting a conventional panelboard, to a split-bussed panelboard in combination with means for individual-tenant metering, an enclosure of the conventional panelboard containing within it:
   (i) a plurality of branch-circuit breakers with operating levers for a plurality of tenants;
   (ii) a plurality of branch-circuit conductors connected to said breakers, said conductors entering the enclosure through at least one aperture in a wall thereof;
   (iii) an interior mounting pan on which said breakers are mounted;
   (iv) a plurality of buses, the buses insulatively mounted upon the interior mounting pan, said breakers electrically connected to the buses;
   (v) mounting pan supporting means;
   (vi) a feeder conduit containing a plurality of hot feeder conductors;
   (vii) a dead-front panel, having apertures for access to the operating levers of said breakers and having means securing the dead-front panel;
   (viii) a front cover;
   the converting apparatus comprising, in combination:
   (a) a replacement interior for the conventional panelboard, said replacement interior having mounting means, having split-busing insulatively supported upon said mounting means, said busing split to isolate electrically said plurality of branch-circuit breakers of each of said tenants, a plurality of branch circuit conductors for each of said tenants being fed through new tenant main breakers, said main breakers being electrically connected to the line side of said split-bus, and said main breakers having means for physical spacing from adjacent said branch-circuit breakers, the enclosure having within it mating mounting means attached to said mounting means of said replacement interior;
   (b) a wall of said enclosure having an aperture formed therein;
   (c) a first covering and sealing means for said aperture in said enclosure wall, said covering and sealing means having a mating aperture therein;
   (d) means coupling said first covering means to a second covering means;
   (e) a meter-supporting enclosure, into which said hot feeder conductors are deflected through said coupling means, said second covering means mating with a wall of said meter-supporting enclosure, said meter-supporting enclosure having an aperture in a wall thereof, said meter-supporting enclosure also having covering means, said covering means having means mounting a plurality of said tenant metering means, said tenant metering means having a plurality of line terminals, said line terminals connected to said feeder conductors within said meter-supporting enclosure, said tenant metering means also having a plurality of load terminals, said load terminals having means for connection through said coupling means to a plurality of line terminals of said main tenant breakers, said meter-enclosure covering means engaged in sealing fashion with said meter-supporting enclosure;
   (f) a new dead-front panel, having apertures therein for said individual tenant main-breaker and said branch-circuit breaker operating-levers, said new dead-front panel having means for locking it in position in said enclosure, and when in said position, said dead-front panel enclosing said feeder conductors passing through said enclosure into said meter-supporting enclosure, said branch-circuit conductors, said breakers, and said replacement interior; and (g) ventilating means in said enclosure, said ventilating means removing excess heat from said bussing, from said maintenant breakers through said physical spacing around said main breakers, from said branch-circuit breakers, from said feeder conductors and said means for connection of said load terminals of said metering means to said tenant main breakers.

2. An apparatus as recited in claim 1, in which said meter-supporting enclosure is of any conventional multiple-gang design.

3. An apparatus as recited in claim 1, in which main tenant breakers are not spaced physically away from said branch-circuit breakers.

4. An apparatus as recited in claim 1, in which the top of the enclosure is unperforated.

5. An apparatus as recited in claim 1, in which said panelboard enclosure is recessed within the building wall on which is also mounted said meter-supporting enclosure, said panelboard having raintight extension means coupling said panelboard enclosure with said meter-supporting enclosure.

* * * * *